Jan. 29, 1963

S. H. BLUBAUGH 3,075,854

METHOD OF PAINTING TREATED CONCRETE SURFACES

Original Filed Jan. 5, 1960

INVENTOR.
Sylvester H. Blubaugh
BY
Bacon & Thomas
ATTORNEYS

Jan. 29, 1963  S. H. BLUBAUGH  3,075,854
METHOD OF PAINTING TREATED CONCRETE SURFACES
Original Filed Jan. 5, 1960  3 Sheets-Sheet 2
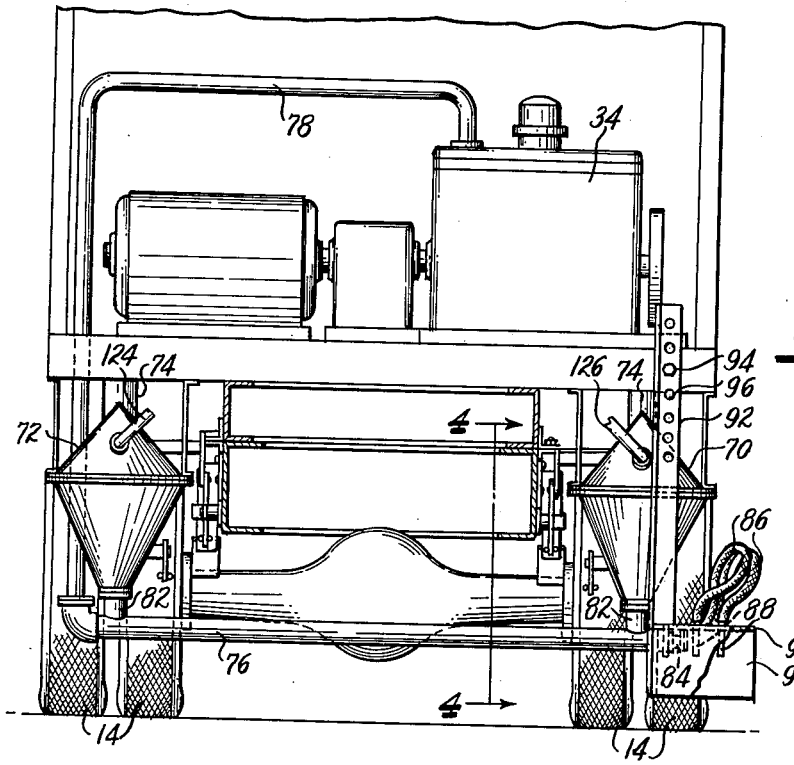
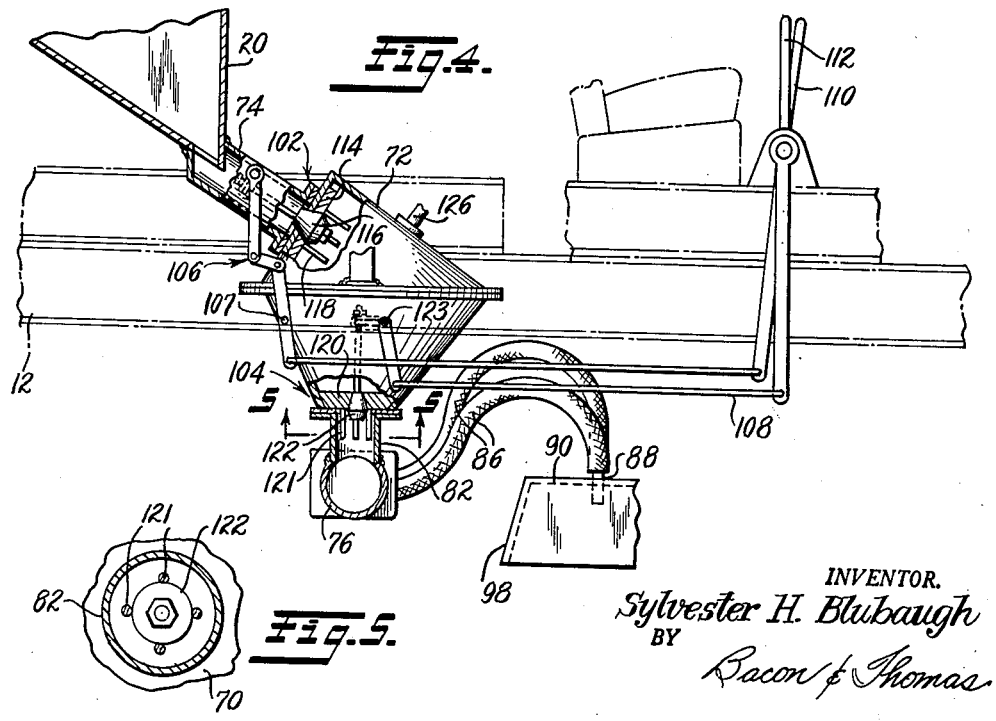
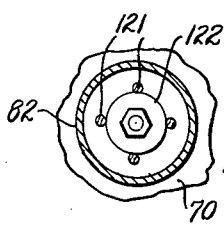
INVENTOR.
Sylvester H. Blubaugh
BY
Bacon & Thomas
ATTORNEYS

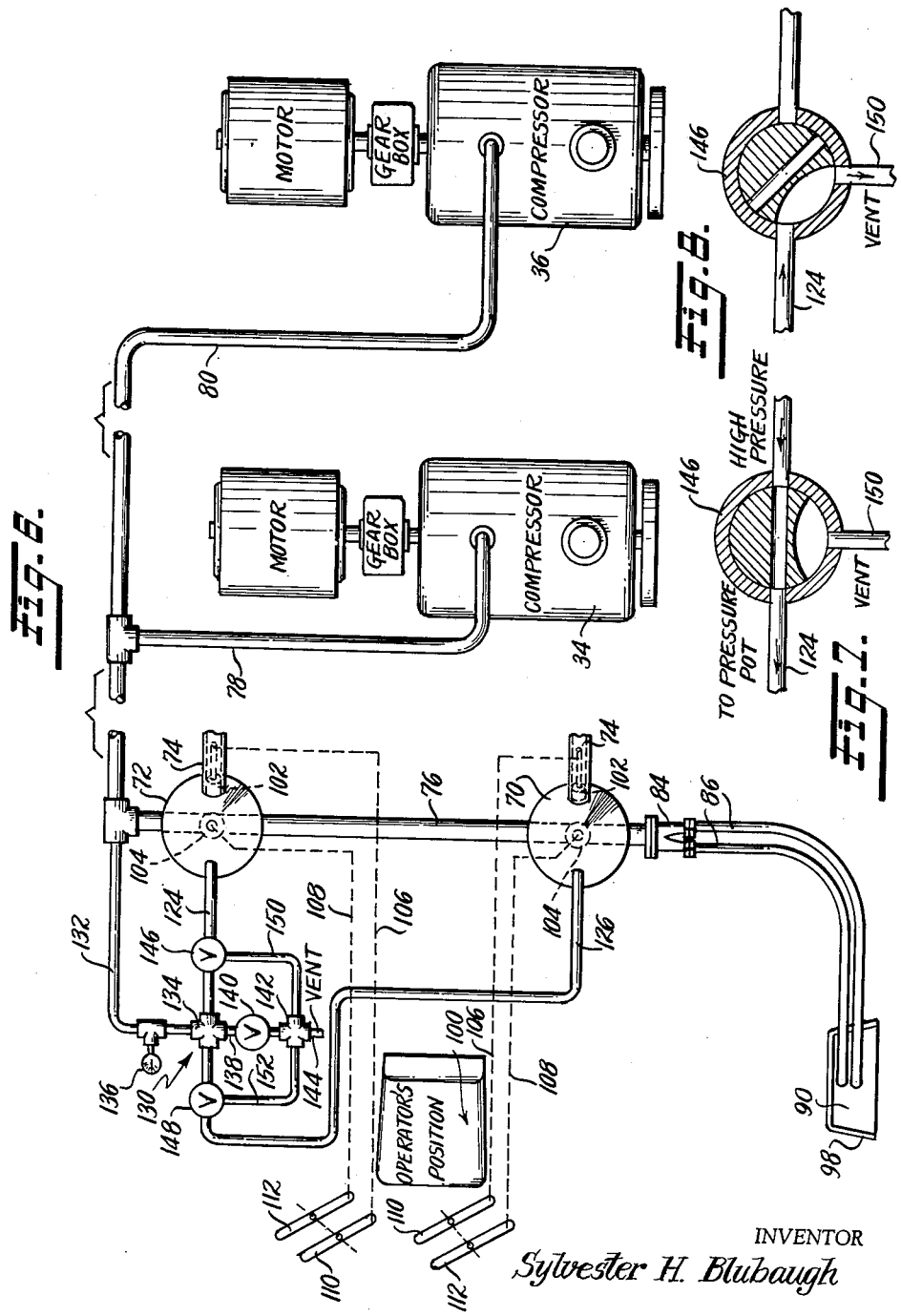

United States Patent Office 3,075,854
Patented Jan. 29, 1963

3,075,854
METHOD OF PAINTING TREATED
CONCRETE SURFACES
Sylvester H. Blubaugh, Mansfield, Ohio, assignor of one-half to James W. McCormick, Mansfield, Ohio
Original application Jan. 5, 1960, Ser. No. 607. Divided and this application Oct. 27, 1960, Ser. No. 65,434
3 Claims. (Cl. 117—37)

This invention relates to a continuous sandblast method and apparatus and more particularly to such method and apparatus as adapted to the treatment of concrete paving surfaces. The invention in its method aspect is especially related to the finishing of concrete paving surfaces for the purpose of preparing such surfaces for subsequent painting operations and for the leveling of high or uneven portions of such surface.

In modern concrete paving operations, it has become customary to apply a sealing composition to the surface of the fresh concrete to prevent the rapid evaporation of moisture therefrom and to thus facilitate proper curing of the concrete. Such sealing compound may comprise an organic solvent containing lacquer and a relatively high proportion of wax-like constituents. When applied to the concrete surface, it provides an effective sealing membrane. While such membrane is very effective in performing the desired function of eliminating rapid evaporation of moisture, applicant has found that when paint is applied over such surface, particularly on highways, airstrips, parking lots, and other areas subject to heavy traffic, the life of the painted surface is relatively short. Until the present invention, neither the cause of such short paint life nor the solution to this problem had been discovered. Applicant has now found that if the membrane left by the curing compound is removed as a preliminary step in the painting operations, the life of the paint eventually applied is substantially lengthened. Further, applicant has developed a method and apparatus whereby the sealing membrane not only can be removed in a rapid and effective manner, but during the operation to remove such sealing membrane high or uneven spots may be removed from new concrete surfaces, thereby bringing them up to the rigid specifications imposed by federal and state highway and airport officials.

It is, therefore, a general object of the present invention to provide a rapid and economical method and apparatus for the finishing of concrete paving surfaces.

Another object of the invention is to provide a continuous method for removing a surface membrane from concrete paving structures.

Another object of the invention is to provide an improvement in the method of painting concrete surfaces.

Another object of the invention is to provide a continuous sandblasting apparatus for surface treatment of concrete pavements.

A further object of the invention is to provide a sandblasting apparatus for removing the surface layer of a selected strip on a concrete pavement while said apparatus is continuously advancing in the direction of such strip.

A still further object of the invention is to provide a continuous sandblasting apparatus for traveling over and treating the surface of a concrete pavement, wherein all controls for driving the vehicle and for operating the sandblasting equipment are within the reach of a single operator.

These and other objects and advantages of the invention will be more readily understood from the following description taken in conjunction with the attached drawings, in which:

FIG. 3 is a fragmentary, sectional view taken on the lines 3—3 of FIG. 2;

FIG. 4 is a fragmentary, sectional view taken on the lines 4—4 of FIG. 3;

FIG. 5 is a sectional view taken on the lines 5—5 of FIG. 4;

FIG. 6 is a diagrammatic view illustrating the control features of applicant's invention;

FIG. 7 is a diagrammatic view illustrating the operation of one of the control valves shown in FIG. 6; and FIG. 8 is a diagrammatic view showing the valve of FIG. 7 in a different control position.

The invention in one of its method aspects comprises an improvement in the painting of concrete surfaces which have been seal-coated with a curing compound to provide a thin surface membrane retarding evaporation of moisture, such improvement including the step of sandblasting the concrete surface in a continuously moving path substantially the width of the surface to be painted, to thereby remove the sealing membrane. The method also involves a new combination of steps for treating concrete pavements which have been seal-coated as described, including sandblasting the surface to be painted to thereby remove the membrane, acid-treating the sandblasted surface to neutralize alkaline substances, and applying paint to the so-treated surface. The combination may also comprise the additional step of sandblasting high or uneven spots in the concrete surface adjacent the path prepared for painting to thereby provide a finished and painted pavement. It will be understood, however, that the latter step has utility alone as well as in the combination with the painting operation.

Figure 1:
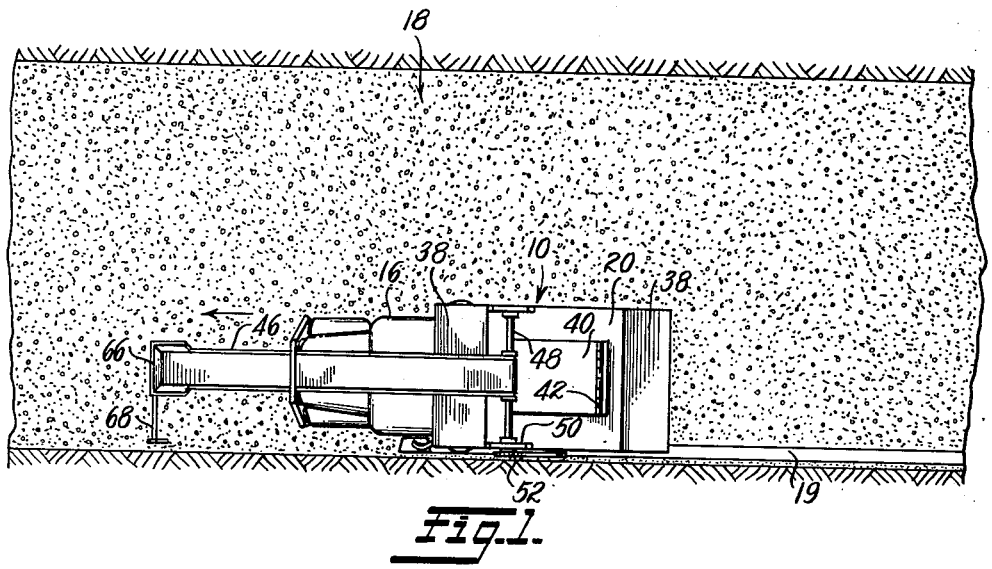
FIG. 1 is a plan view showing applicant's novel sandblasting apparatus in the process of preparing a concrete highway surface for the reception of an edge paint strip.
Figure 2:
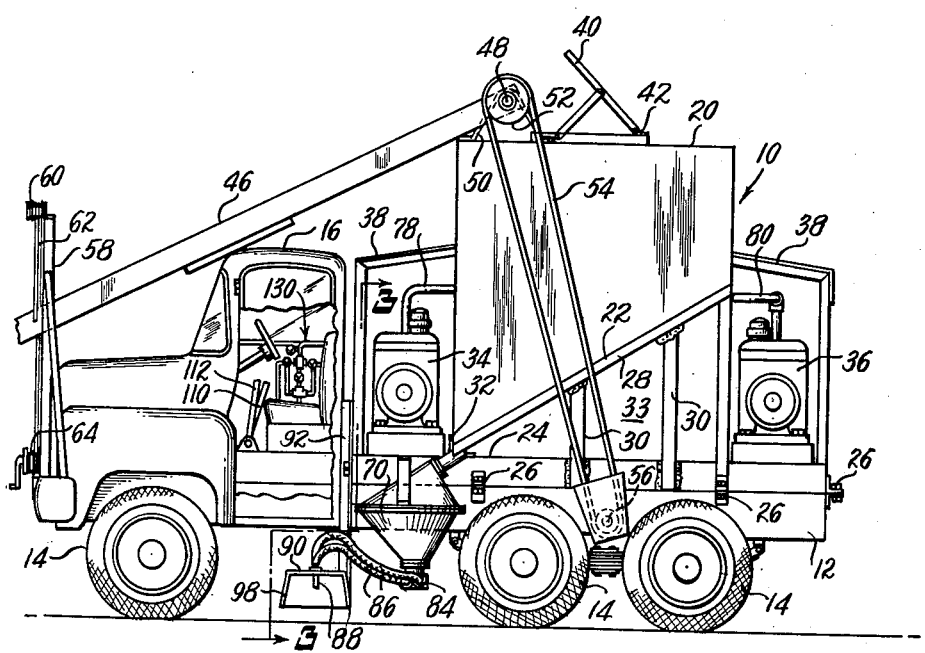
FIG. 2 is a side elevation of the novel sandblasting apparatus shown in FIG. 1.

Referring now to the dawings, and particularly to FIGS. 1 and 2, the apparatus is shown to comprise a truck generally designated as 10, having a chassis 12 mounted on wheels 14 in a conventional manner. At the forward end of the chassis is a conventional truck-driving assembly, including a cab 16 containing the usual controls for operating the vehicle on a highway. Thus, as shown in FIG. 1, the truck 10 may be driven down a section of concrete highway pavement generally designated as 18, to provide a treated edge strip 19. Center lines and other marking lines can be pre-treated in the same manner.

Mounted upon the chassis 12 to the rear of the cab 16 is a sand supply bin 20 having a forwardly sloping bottom 22. The bin may be designed for any desired capacity but preferably holds several cubic yards of sand, i.e., sufficient sand for prolonged supply without refilling. The sand supply bin 20 is supported on chassis 12 by means of channel members 24 overlying the chassis member 12 and secured thereto by means of lugs and bolts 26. The bottom of the bin 20 rests upon inclined channel members 28, which are supported by vertical members 30 welded to the channels 24. The forward bottom end of the sand bin 20 abuts the inside of an angle member 32, likewise welded to channel members 24. A gas tank 33 for supplying fuel to all engines of the apparatus is located in the space between the bottom 22 of the sand supply bin 20 and the chassis 12 and rests upon cross members of the chassis 12.

A pair of air compressors 34 and 36 are mounted on either side of the sand bin 20 upon the channels 24 to which they are secured by any suitable means. The air compressors 34 and 36 are protected from the weather by any suitable covering means 38.

The top of the sand supply bin 20 is provided with an opening having a cover 40 which is hinged at its rear end as at 42 and is adapted to be propped open by brace member 44 during a filling operation. In order rapidly to fill the bin 20 with sand while the device is on the job, a moving belt conveyor 46 is mounted to extend above and forward of the cab 16. The top end of the belt conveyor 46 is supported by means of a shaft 48 journaled in a pair of brackets 50 secured to the top of bin 20. The shaft 48 is arranged to be driven by means of sprocket wheel 52, connected by chain drive 54 to a power take-off 56 from the truck transmission.

The forward end of the conveyor 46 is supported within a rectangular frame 58 secured at its lower end to the forward portion of the chassis 12. The forward end of the conveyor 46 is vertically adjustable to a selected position within frame 58 by rotation about the shaft 48 as an axis. Such adjustment is accomplished by means of a pulley 60, cable 62, and hand winch 64. The forward extremity of belt conveyor 46 may, therefore, be lowered to receive sand from a dump truck which backs into position ahead of the sandblasting apparatus 10. Suitable means (not shown) are provided for locking the conveyor in the selected position. A hopper 66 at the lower end of the conveyor 46, as shown in FIG. 1, facilitates the sand-loading operation.

When the sandblast apparatus 10 is to be moved at a rapid rate over the highway, as from one job to another, the sand conveyor 46 is moved to its topmost position and there secured so as not to obscure the vision of the driver of the vehicle. When the device 10 is in operation for sandblast purposes to provide a surface strip down the edge of a concrete pavement, as shown for example in FIG. 1, the conveyor 46 is secured in a lowered position whereby it may receive sand from a sand truck and, as will be described later, may also serve as a holder for a guide means 68 (FIG. 1), making it easier for the driver to properly position the sandblast nozzles with respect to the pavement as the vehicle advances in a forward direction.

Mounted beneath the forward compressor 34 and forward of the bottom of the sand supply bin 20, and just to the rear of the cab 16 are a pair of pressurized sand pots 70 and 72. The structure of these sand pots is best shown in FIGS. 3 and 4. Thus, each sand pot is connected by a conduit 74 to the bottom of the sand supply bin 20 and is adapted to receive a supply of sand therefrom. A compressed air supply conduit or manifold 76 is mounted transversely beneath the truck chassis and receives compressed air from compressors 34 and 36 by means of supply conduits 78 and 80 (FIGS. 2 and 6). It will be understood that the apparatus is not limited to the use of two air compressors, the number of such compressors being governed by their output capacity. Thus, it is desirable to provide an air pressure of about 80 to 90 pounds per square inch or above and one or more compressors may be utilized for such purpose, depending upon their individual capacity.

Each of the pressurized sand pots 70 and 72 is connected at its bottom by means of a conduit 82 to the manifold 76 which at its outer end, as shown to the right of FIG. 3 and in FIG. 6, is provided with a bifurcated adaptor 84 for connection with a pair of high-pressure, rubber-lined, flexible hoses 86. These hoses 86 are connected to a pair of vertically disposed, laterally spaced steel pipes 88 which, for example, may be about 8 inches long and ⅜ inch inside diameter. The pipes 88, which provides nozzles for the sandblasting equipment, are carried by and extend through the top of a box 90 mounted for vertical adjustment with respect to an underlying concrete surface by means of a vertical standard 92 secured to the base of compressor 36 by means of bolts 94, as shown in FIG. 3. A plurality of bolt holes 96 are provided in the standard 92 so that a selected vertical position of the box 90 and pipes 88 may be chosen.

The box 90, as shown, comprises rubber side walls 98 around three sides thereof, the side away from the truck being open to permit the escape of sand and air. It will be understood, of course, that such box could be completely closed and other means for removing sand therefrom could be provided, such as vacuum means attached to a cyclone separator (not shown).

Referring now to the air-and-sand controls for the apparatus and with particular reference to FIG. 6, it will be noted that all of the controls are placed within reach of the truck operator's position designated by reference numeral 100. Each of the pressurized sand pots 70 and 72 is provided with two valves for sand control, one, generally designated by reference numeral 102, in conduit 74 between the sand pot and the sand supply bin 20, and the other, generally designated by reference numeral 104, at the bottom of the sand pot for controlling the flow of sand from the pressurized sand pot to the manifold 76. These valves 102 and 104 are operated by mechanical linkages 106 and 108, respectively, shown in dotted lines in FIG. 6. The linkages 106 and 108, in turn, are connected to control levers 110 and 112 in the cab 16. Levers for the control of the valves 102 and 104 of the right sand pot 70 may be located to the right of the operator's position in the cab, and levers for the control of the left sand pot 72 may be mounted to the left of the operator's position, as indicated.

The structure of the valves 102 and 104 for the pressurized sand pots 70 and 72 is illustrated in FIG. 4. Thus, the top valve 102 comprises a valve seat 114 positioned within the top of the sand pot itself. A rubber plunger member 116 is adapted to reciprocate within such seat 114 to open or close the valve. Four guide members 118 depending from the valve seat 114 facilitate the proper alignment of the plunger 116 during actuation. Actuation of the valve 102 is accomplished by means of the mechanical linkage 106, which includes a pivot 107 fixed to the truck chassis 12. By pushing the lever 110 forward, as shown in FIG. 4, the linkage 106 will cause plunger 116 to be lowered from its seat 114, thereby opening the valve. The sand pot 70 thereby fills with sand by gravity flow from bin 20. It will be noted that the valve plunger 116 in its closed position, as shown in FIG. 4, will be maintained in such position by means of air pressure in the pressurized sand pot 70. Pressure in the sand pot 70 is released, as will presently be described, when the valve 102 is to be opened for the replenishing of sand from bin 20 and air pressure is restored while the valve is being closed, thereby facilitating its closure.

The lower valve 104, likewise, may include a valve seat 120 positioned within the sand pot 70 and a cooperating plunger 122 adapted for reciprocation therein. Guide members 121 maintain plunger 122 in proper alignment. The plunger 122 in the closed position of the valve is maintained in such position by the air pressure in manifold 76 during the filling of the sand pot, and this valve is opened only when air pressure in the pot is equalized with that in the manifold 76. Valve 104 is actuated by mechanical linkage 108. By pulling lever 112 to the rear, as shown in FIG. 4, shaft 123, comprising a part of the linkage 108 and extending through the wall of the sand pot, is rotated to cause plunger 122 to be lowered.

The sand pots 70 and 72 are provided with pressure-equalizing lines 124 and 126 connected at the top of the pressure pots as shown and leading to an air-valve control unit generally designated as 130 (FIG. 6), also positioned in the cab in easy reach of the operator of the vehicle. Air pressure from the compressor line is provided to the air-valve control unit 130 by means of a branch conduit 132 leading to a four-way connector 134. A pressure gauge 136 is provided in the line 132 within the line of vision of the operator. A conduit 138 containing a cut-off valve 140 leads through a connector 142 to a vent 144 which exhausts to atmosphere. The pressure-equalizing lines 124 and 126 to the sand pots 70 and 72 are connected by means of valves 146 and 148, respectively, to connector 134 whereby these lines may receive air from branch line 132. The valves 146 and 148 are connected by means of lines 150 and 152, respectively, to the connector 142 and thereby to the exhaust vent 144.

The valves 146 and 148 are constructed as shown in FIGS. 7 and 8, so that in one position thereof, as shown in FIG. 7, the line pressure is connected to the pressure pot to equalize the air pressure therein with that in manifold 76; and in the other position, as shown in FIG. 8, the line pressure is cut off and the pressure pot is vented to the atmosphere.

In the operation of the device, as for example, to prepare an edge strip along a concrete highway pavement for the reception of paint, the apparatus 10 after having its sand hopper filled with sand by means of conveyor 46 is positioned at the edge of the pavement, as shown in FIG. 1. Air compressors 34 and 36 are then started, valve 140 (FIG. 6) being opened to the atmosphere, and valves 146 and 148 likewise being open to the atmosphere, as shown for example in FIG. 8, thereby releasing any air pressure from the sand pots 70 and 72. The lower valve 104 in each of the sand pots is in closed position, as shown in FIG. 5. After the compressors are operating properly, valve 140 may be closed and the pressure will build up in the line to the desired extent, as indicated by gauge 136. Eighty to ninety pounds of pressure have been found satisfactory, but greater pressures and increased forward speed are contemplated. Valve 140 provides a ready means for regulating the air pressure to a uniform value from the cab, excessive pressure being reduced by slightly cracking the valve.

The top valves 102 between the sand bin 20 and pressure pots are now opened by the operator by the manipulation of levers 110 to permit the pressure pots to receive a load of sand by gravity flow from the hopper 20. The bottom valves are maintained in closed position by means of the line pressure in manifold 76 beneath the plungers 122 of valves 104. After the pressure pots 70 and 72 are filled, top valves 102 are closed by manipulation of hand levers 110 and, if necessary, for easy closure of these valves, some compressed air may be permitted to enter the pots 70 and 72 by opening valves 146 and 148 slightly toward the positions shown in FIG. 7 so that air pressure uner the plunger 116 will facilitate the closing of the top valve 102.

Assuming that it is desired to now operate by use of sand from the pressure pot 72, the air-valve 148 (FIG. 6) is fully opened to the position shown in FIG. 7 to permit the pressure to fully equalize in the pot 72 with the line pressure in manifold 76. Lever 112 is now operated to open the valve 104 by dropping the plunger 122 (FIG. 4) and sand will gravity feed into the manifold 76 to be carried therethrough by the rapidly moving air stream and through the downwardly directed pipes 88 at the end of the flexible hoses 86, to thereby impinge with great force upon the underlying concrete surface.

The pipes 88 when set on 4" centers and having their vents positioned about two feet from the concrete will clean the surface membrane from such concrete in about a 6" wide strip, shown at 19 (FIG. 1), while the truck is being advanced in a forward direction at a rate of about 5 to 7 miles per hour. The nozzle spacing can be changed and additional nozzles may be added if wider strips are desired. Adjustment of the nozzles vertically with respect to the surface will also effect an adjustment of the width of the sandblast path. However, the nozzle ends are usually positioned at least 6" away from the surface of the pavement.

The operator of the truck may keep the vehicle in proper alignment by maintaining a line of sight against the edge of the highway across the tip of guide member 68 (FIG. 1) carried by the forward portion of the sand conveyor 46. Further, due to the positioning of the nozzle box 90 below and adjacent the side of cab 16, it is possible for the driver to observe at all times whether or not the device is properly operating. Thus, one operator can drive the vehicle and control all of the sandblasting operations while sitting within the cab.

The device may be continuously operated throughout the working day to cover a great number of miles of treated pavement As one pressure pot is exhausted of sand, operation is readily shifted to the other pressure pot by proper manipulation of the valves and levers. Thus, assuming the sand pot 72 was the first to be placed on the line, sand pot 70 being filled in readiness for continued operation, upon the exhaustion of sand from pot 72, the lower sand valve 104 in pot 70 is simply opened by manipulation of right-hand lever 112 The sandblasting operation continues with sand from this pot. Valve 146, of course, has been opened to provide pressure equalization between the sand-filled pot 70 and the line 76. As soon as this switch-over has been accomplished, the operator pushes the left-hand lever 112 to close lower valve 104 in the pot 72, turns valve 148 to vent this pot to the atmosphere and then opens valve 102 between the pot and the sand bin 20 to permit pot 72 to gravity fill. When it is filled, he closes valve 102, switches the valve 148 to pressure-equalize this pot with the line, and is thus in readiness for placing this pot into operation as soon as the other is emptied.

As soon as the surface membrane is removed, the strip may be acid-treated to neutralize alkalies and painted in the usual manner. It is thought that removal in the membrane permits the desired action of the acid to take place so that the paint is not "killed" by the action of the alkalies which eventually come through such membrane. However, applicant does not wish to be bound by such theory. Suffice to say that the life of the paint is substantially prolonged by reason of the preliminary step.

In modern construction, after a new concrete paving operation, inspectors determine the existence of high spots or uneven spots in the surface. These spots are usually marked with a daub of paint of characteristic color. Heretofore, the paving contractors have utilized a special piece of grinding equipment comprising a series of rotating knives operated by a gasoline motor for grinding down these high or uneven spots. Such grinding may take as much as 10 or 15 minutes for a spot of several feet in diameter, and the grinding knives must soon be replaced. It is a tedious, time-consuming, and costly operation.

In accordance with the present method and apparatus for finishing concrete paving surfaces, an auxiliary, flexible air hose (not shown) is provided, having a nozzle at the end thereof. This auxiliary hose can be coupled to manifold 76 after first uncoupling the hoses 86 attached to the sandblast box 90. Hoses 86 are simply coiled out of the way and after the auxiliary hose has been attached, the other outlet of the member 84 is closed by means of a threaded plug. Sandblasting of the high or uneven spots in the paving surface is accomplished through such auixilary hose. It has been found that a high spot requiring as much as 10 or 15 minutes by the conventional grinding equipment can be removed within a matter of seconds by means of the present equipment. It will be seen that a great deal of time and effort have been saved by the use of the present device as a replacement for such grinding equipment.

When the device is used for preparing strips on a concrete surface for reception of paint, high spots can be removed from such surface at the same time by simply stopping the vehicle as each marked high spot is reached, attaching the auxiliary hose, removing the high spot without moving the vehicle out of alignment with the strip to be prepared, and then shifting back to normal operation along the original path. However, the device may be used solely for the purpose of removing high spots from pavement without regard to painting operation. Both procedures are facilitated by the possibility of prolonged continuous operation, easy control, and rapid transportability from place to place.

If it is desired to cut down upon dust, a water tank may be mounted on the truck chassis at an appropriate location and water therefrom dropped on the paved surface immediately ahead of the sandblast nozzles at a rate of approximately 20 gallons per mile.

It will be apparent to those skilled in the art that a great number of modifications are possible in the method and apparatus without departing from the spirit and scope of the invention as set forth in the appended claims.

This application is a division of my copending application Serial No. 607, filed January 5, 1960.

I claim:

1. A method of applying a painted marking strip to concrete pavement which has been seal-coated with a curing composition to provide a thin surface membrane retarding evaporation of moisture and wherein said membrane is still present on the surface of said pavement, comprising: removing said membrane from the surface of the pavement along the strip to be painted by sandblasting said surface, acid-treating said sandblasted surface to neutralize alkaline substances, and applying paint to the so-treated surface.

2. The method of claim 1 wherein in the sandblasting step comprises bombarding said strip in a continuously advancing path with dry sand under an air pressure of at least 80 pounds per square inch from nozzles substantially vertically directed toward said strip and spaced therefrom by at least about six inches.

3. The method of claim 2 wherein said nozzles are continuously advanced along said strip at a speed of at least ten miles per hour.

References Cited in the file of this patent

UNITED STATES PATENTS

| | | |
|---|---|---|
| 1,130,717 | Ellis | Mar. 9, 1915 |
| 1,954,111 | Wilks | Apr. 10, 1934 |
| 2,684,558 | Harris et al. | July 27, 1954 |
| 2,729,918 | Van Denburgh | Jan. 10, 1956 |